United States Patent
Van Der Meijs

(10) Patent No.: US 7,375,834 B2
(45) Date of Patent: May 20, 2008

(54) METHOD OF CONFIGURING A PRINTER AND INK CARTRIDGE

(75) Inventor: Hermanus H. Van Der Meijs, Venlo (NL)

(73) Assignee: Oce-Technologies B.V., Venlo (NL)

( * ) Notice: Subject to any disclaimer, the term of this patent is extended or adjusted under 35 U.S.C. 154(b) by 770 days.

(21) Appl. No.: 10/085,765

(22) Filed: Mar. 1, 2002

(65) Prior Publication Data
US 2002/0122204 A1 Sep. 5, 2002

(30) Foreign Application Priority Data
Mar. 2, 2001 (NL) ................................ 01200796

(51) Int. Cl.
*G06F 15/00* (2006.01)
*G06F 9/44* (2006.01)

(52) U.S. Cl. .................... 358/1.15; 358/1.16; 717/172; 717/173; 717/177; 717/178; 399/12; 399/13

(58) Field of Classification Search ...... 358/1.14–1.16; 347/1; 717/103, 169–173, 175–178; 399/12, 399/13
See application file for complete search history.

(56) References Cited

U.S. PATENT DOCUMENTS

| | | | |
|---|---|---|---|
| 4,661,822 A * | 4/1987 | Hirota et al. .................... 347/6 |
| 4,872,027 A | 10/1989 | Buskirk et al. |
| 5,049,898 A | 9/1991 | Arthur et al. |
| 6,003,078 A | 12/1999 | Kodimer et al. |
| 6,039,430 A * | 3/2000 | Helterline et al. ............. 347/19 |
| 6,113,208 A * | 9/2000 | Benjamin et al. ............... 347/7 |
| 6,364,451 B1 * | 4/2002 | Silverbrook .................. 347/42 |
| 6,522,348 B1 * | 2/2003 | Brot et al. ................... 347/214 |
| 6,607,314 B1 * | 8/2003 | McCannon et al. ........... 400/62 |
| 6,732,195 B1 * | 5/2004 | Baldwin ......................... 710/6 |
| 6,738,903 B1 * | 5/2004 | Haines ........................ 713/168 |
| 6,761,491 B2 * | 7/2004 | Hall ............................ 396/567 |
| 6,938,976 B2 * | 9/2005 | Siwinski et al. ............... 347/19 |
| 6,947,995 B2 * | 9/2005 | Chang et al. ................ 709/231 |
| 6,990,659 B1 * | 1/2006 | Imai ............................ 717/171 |
| 7,099,028 B2 * | 8/2006 | Schneider et al. .......... 358/1.15 |

(Continued)

FOREIGN PATENT DOCUMENTS

EP 0 971 287 A2 7/1999

(Continued)

OTHER PUBLICATIONS

Lonis, Robert A., "Storage of Operating Parameters in Memory Integral with Printhead", Xerox Disclosure Journal, Nov./Dec. 1983, vol. 8, No. 6, p. 503.

Primary Examiner—Douglas Q. Tran
Assistant Examiner—Chan S Park
(74) Attorney, Agent, or Firm—Birch, Stewart, Kolasch & Birch, LLP

(57) ABSTRACT

A method of configuring a printer is disclosed, wherein a set of printing parameters is stored in a control unit of the printer. The method includes the steps of storing the set of printing parameters, which is adapted to a specific functional component of the printer, in a storage device addressable over the Internet at a predetermined URI (Universal Resource Identifier); and, when the printer is to be configured, getting access to the URI and downloading the set of printing parameters directly into the control unit of the printer.

16 Claims, 2 Drawing Sheets

U.S. PATENT DOCUMENTS

| | | | |
|---|---|---|---|
| 7,107,537 B2* | 9/2006 | Abu-Husein | 715/740 |
| 2001/0047514 A1* | 11/2001 | Goto et al. | 717/11 |
| 2002/0022990 A1* | 2/2002 | Kurata et al. | 705/14 |
| 2002/0113991 A1* | 8/2002 | Borg et al. | 358/1.15 |
| 2004/0225757 A1* | 11/2004 | Moreau et al. | 710/8 |
| 2005/0052660 A1* | 3/2005 | Sabbagh et al. | 358/1.1 |

FOREIGN PATENT DOCUMENTS

| | | |
|---|---|---|
| EP | 1 004 449 A2 | 11/1999 |
| JP | 10-224648 | 8/1998 |
| JP | 10-323999 | 12/1998 |
| WO | WO 01/14146 A1 | 3/2001 |

* cited by examiner

METHOD OF CONFIGURING A PRINTER AND INK CARTRIDGE

RELATED APPLICATION

The present application claims the priority benefit of the European Patent Application No. 01200796.9 filed Mar. 2, 2001, which is herein fully incorporated by reference.

BACKGROUND OF THE INVENTION

1. Field of the Invention

The invention relates to a method of configuring a printer, wherein a set of printing parameters is stored in a control unit of the printer. The invention further relates to a printer suitable for executing this method and to an ink cartridge for use with an ink jet printer of this type.

2. Discussion of Background Art

A printer typically has at least one functional component, e.g. a nozzle head or an ink cartridge in case of an ink jet printer, an LED array, a photoconductor or a toner cartridge in case of a laser printer, which influences the settings of printing parameters. Thus, when such a functional component is replaced, it may be necessary to reconfigure the printer, i.e. to change the parameter settings, in order to assure a proper operation of the printer and/or to achieve the best possible image quality. One example of printing parameters which need to be reconfigured upon insertion of a new print head into the printer are the voltages with which the individual nozzles of an ink jet nozzle head or the individual LEDs of a laser printer are to be energized. Another example is the compensation of positional errors of the individual nozzles or LEDs. In a scanning-type ink jet printer or laser printer, the nozzles and LEDs, respectively, are typically arranged in a linear array which extends orthogonal to the main scanning direction. Due to manufacturing tolerances, the positions of the nozzles or LEDs in the main scanning direction may slightly deviate from one another. Such position errors can be compensated by providing suitable time offsets in the timings at which the nozzles or LEDs are fired during the scan motion of the print head. The nozzles of print heads manufactured in one same production series will normally have the same position errors, so that the corresponding time offsets will be the same for all print heads belonging to this series. However, when a print head from another production series is used, it may be necessary to reconfigure the printer in order to provide that corrected time offsets. Other parameters may, for example, be related to the transportation speed of the recording paper, compensation of changes in the slip and/or thickness of the recording paper, colour correction routines and the like.

Some printing parameters such as voltages, operating temperatures and the like may also depend on the age of the ink or toner being used.

For more convenient configuring or re-configuring of a printer having an interchangeable print head, it has been known for long that the printing parameters pertinent for a specific print head may be encoded or stored in a memory element that is provided on the print head. When the print head is mounted in a printer, the information stored in the memory element is automatically read by the control unit of the printer, and thus, the new printing parameters are stored. Methods of this type are disclosed for example in "Xerox Disclosure Journal" Vol. 8, No. 6, 1983, page 503; U.S. Pat. No. 4,872,027 and U.S. Pat. No. 5,049,898. These known methods all have the drawback that, once the printing parameters have been stored in the memory element, it is no longer possible or very cumbersome to adapt the configuration of the printer, when the operating conditions have changed.

SUMMARY OF THE INVENTION

It is an object of the invention to provide a method and a printer which permit to change the configuration of the printer more flexibly.

It is another object of the invention to provide a method of configuring a printer, a printer suitable for executing the method, and an ink cartridge for use with such printer, which overcome the problems and disadvantages associated with the related art.

According to the invention, these objects are achieved by a method of configuring a printer, comprising the steps of storing a set of printing parameters, which is adapted to a specific functional component of the printer, in a storage device addressable over the Internet or other network at a predetermined URI (Universal Resource Identifier); and, when the printer is to be configured, getting access to the URI, and downloading the set of printing parameters directly into the control unit of the printer.

Thus, the printing parameters pertinent to the functional component are downloaded through the Internet.

It has been proposed already in U.S. Pat. No. 6,003,078 to use Internet communication for remote failure diagnosis of a printer connected to a computer network. The invention, however, uses the Internet for a different purpose, namely for performing a configuration procedure which is normally executed either manually or automatically before the printer is first put into operation or when a functional component of the printer has been interchanged. Since the printing parameters are downloaded through the Internet directly into the control unit of the printer, the user is relieved from the burden of entering the printing parameters manually, as in the conventional art in which the printing parameters are read from a memory element on the functional component.

One of the main advantages of the invention is that the set of printing parameters pertinent to a specific functional component can be modified even after the functional component has been delivered. As a result, it is possible for example to take account for new experiences which have been made on the side of the manufacturer after the printers and the functional components thereof have been delivered and have been used in practice for some time. Likewise, it is possible to adapt the configuration of the printer to new technical developments or new operating conditions which have not been foreseen at the time when the functional component was manufactured and delivered. For example, when the functional component is a photoconductor drum of a laser printer, the printing parameters that have originally been specified for this photoconductor drum will be optimized for a specific type of toner material to be used with the printer. When, at a later time, a new toner material becomes available, the printer can easily be reconfigured for use with the new toner material by downloading an appropriately modified set of printing parameters according to the present invention. Likewise, the printer may be reconfigured for a new type of recording media.

It is even possible within the framework of the invention to add new functionality to the printer. For example, the printing parameters downloaded through the Internet or other communication network (e.g., intranet, extranet, etc.) may specify a newly developed or improved procedure for cross talk compensation in an ink jet printer or for colour correction in a multi-colour printer. It will be understood in this context that the term "printing parameters" as used herein is not restricted to a set of constants but may also encompass a set of instructions and/or a software routine to be incorporated into the control program of a printer.

A method according to the invention can conveniently be combined with a known Internet based remote diagnosis system for the printer. Then, the printer may be reconfigured in accordance with the result of the remote diagnosis.

Preferably, according to the present invention the URI under which the printing parameters for a given functional component of the printer have been stored is specified on the functional component itself, either in writing or, more preferably, in a machine-readable format, so as to be read automatically when the functional component is inserted into the printer. This will further enhance the convenience for the user and will assure that the correct set of printing parameters is downloaded without the risk of confusion.

A printer suitable for carrying out the method according to the invention comprises a control unit including a memory for storing the printing parameters, and an Internet client, e.g. in the form of a program loaded in the control unit, for connecting to the URI and for loading the printing parameters into the memory.

Preferably, according to the present invention, the printer further comprises a reading head for reading the URI indicated on the functional component when the latter is inserted in the printer. In this case, the Internet client will contact the URI read by the reading head, so that it is not necessary for the user to input the URI manually. The printer may further be programmed to activate the Internet client automatically when a new functional component is inserted in the printer, so that the printer will automatically configure or reconfigure itself without intervention of the user.

An ink or toner cartridge for use with a printer according to the invention includes a memory element in which an URI is stored in a machine-readable format.

BRIEF DESCRIPTION OF THE DRAWINGS

Preferred embodiments of the invention will now be described in conjunction with the drawings, in which.

DESCRIPTION OF THE PREFERRED EMBODIMENTS

Figure 1:
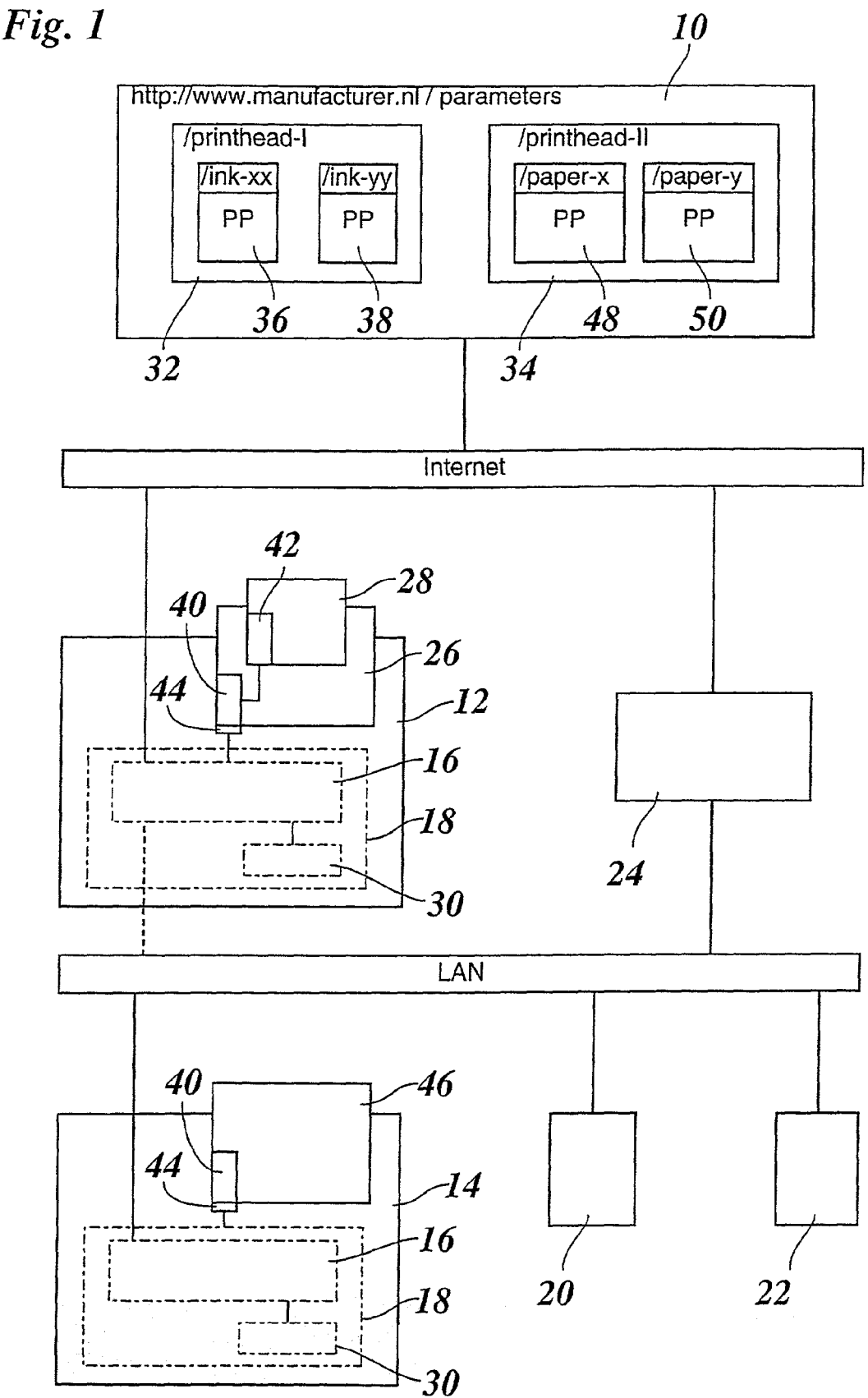
FIG. 1 is a block diagram of a network architecture illustrating different embodiments of the invention.

As is shown in FIG. 1, a web server 10 communicates with a number of printers 12, 14 through the Internet. The printer 12 is directly connected to the Internet through an Internet client 16 which is incorporated in a control unit 18 of the printer. As an alternative, the Internet client 16 may be connected to the Internet through a local area network (LAN), as is indicated by a dashed line in FIG. 1. As is well known in the art, the LAN further connects the printer 12 to a number of workstations 20, 22, so that print jobs may be sent from the workstations 20, 22 to the printer 12. The LAN is connected to the Internet through an internet gateway 24.

In the example shown, the printer 12 is an ink jet printer having an interchangeable print head 26 to which at least one interchangeable ink cartridge 28 is mounted. The control unit 18 of the printer 12 includes a memory 30 for storing at least one set of printing parameters which are needed for appropriately controlling the printing operations. The set of printing parameters that is actually used for controlling the printer 12 is specifically adapted to the properties of the interchangeable functional components, i.e. to the properties of the print head 26 and to the properties of the ink contained in the ink cartridge 28.

The Internet client 16, which is implemented in the control unit 18, is connected to both the Internet and the memory 30 and is capable of downloading a new set of printing parameters from the web server 10 through the Internet. These printing parameters will then be stored in the memory 30.

The web server 10 is, for example, run by the manufacturer of the printers 12, 14 and provides a number of pages 32, 34 each of which is assigned to a specific type or production series of print heads. It may be assumed here that the page 32 which has the Internet sub-address "/printhead-I" is assigned to the print head 26 installed in the printer 12. The page 32 has a number of sub-pages 36, 38 each storing a set of printing parameters PP for a specific type of ink under the sub-address "/ink-xx" and "/ink-yy", respectively. By way of example, "ink-xx" specifies the type of ink contained in the ink cartridge 28. The printing parameters PP stored on the page 36 are then optimized in view of the properties of the print head 26 and in view of the properties of the ink contained in the ink cartridge 28.

When the user has purchased a new print head 26 and/or a new ink cartridge 28 and has installed these functional components in the printer 12, the printer should be configured accordingly, i.e., the pertinent printing parameters stored in the sub-page 36 should be downloaded into the memory 30 of the printer.

Optionally, the user may call up the download procedure manually from one of the workstations 20, 22. In this case, the user will enter the pertinent download address of the web server 10, i.g., "http://www.manufacturer.nl/parameters/printhead-I/link-xx" only as an example. The address information will be found on the print head 26 and on the ink cartridge 28 and/or on the package material thereof and/or in a service manual. When the connection to the web server 10 is established, the user will click a download button to start the download procedure. The web server 10 will then send the printing parameters which will be transferred into the memory 30 as the active printing parameters.

According to the shown embodiment, the procedure for configuring the printer 12 may also be performed automatically by the control unit 18 of the printer. To this end, the print head 26 and the ink cartridge 28 each include a memory element 40 and 42, respectively, which may for example be formed by an integrated circuit chip. The memory element 40 stores the first part of the URI pertinent to the print head 26, i.g., "http://www.manufacturer.nl/parameters/print head-I", whereas the memory element 42 stores the last part of the address, i.g., "/ink-xx". When the print head 26 is mounted in the printer 12, and the ink cartridge 28 is inserted in the print head, the combined contents of the memory elements 40 and 42 can be read by a reading head 44 of the printer which is connected to the Internet client 16. When it is detected with the reading head 44 that a new print head 26 and/or a new ink cartridge 28 has been inserted, the Internet client 16 will automatically call the URI specified on the memory elements and perform a download procedure. When the ink cartridge 28 is replaced by another ink cartridge containing an ink of the type yy, the printing parameters adapted to this type of ink would be downloaded from the sub-page 38 of the web server 10.

Since the printing parameters, for example the voltage levels with which the various nozzles of the print head 26 are to be energized, depend not only on the properties of the print head 26 but also on the properties of the ink being used, it will be understood that, when a large number of different inks can be combined with a large number of print heads of different types, the total number of sets of printing parameters may become considerably large, and it would not be practical to store such large amounts of information on the memory elements 40 and 42. The invention therefore has an advantage of accessing practically an unlimited number of different sets of printing parameters and, accordingly, the invention permits to combine the various functional components of the printer more flexibly.

The printer 14 is an example of an ink jet printer in which an ink cartridge or several ink cartridges for different colours are integrated in the print head 46 itself. The printing parameters for the print head 46 are stored on the server page 34 having the sub-address, e.g., "/print head-II". The page 34 includes sub-pages 48 and 50 which store different sets of printing parameters which are all adapted to print heads 46 of the same type or production series but are optimized for different types of recording paper that may be used in the printer 14. This is because the optimal size of the ink droplets, that is determined by the printing parameters, may be different for different recording media. The type of recording paper loaded into the printer 14 may be input manually on the printer console or through one of the workstations. If the memory 30 of the control unit of the printer 14 is capable of storing only a single set of printing parameters at a given time, then the printer must be reconfigured each time the recording paper is changed. If, however, the memory 30 can store several sets of printing parameters, then the configuration procedure will include downloads of several sub-pages 48, 50, and the active set of printing parameters will be selected in the printer 14, dependent on the type of recording paper.

Figure 2:
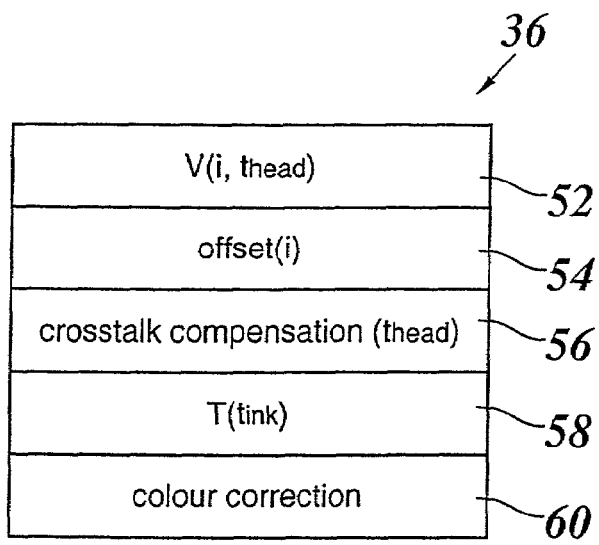
FIG. 2 is an example of a set of printing parameters available on the Internet.

FIG. 2 is an example of a possible set of printing parameters for an ink jet print head, e.g., the print head 26 shown in FIG. 1, which has a plurality of nozzles (indicated by the index i) which may be energized individually. A first group 52 of parameters V(i,thead) specifies, for each nozzle, the voltage with which the nozzle should be energized in order to obtain an ink droplet of optimal size. These parameters are determined experimentally for each production series of print heads and are then stored on a corresponding page on the web server 10. Due to manufacturing tolerances, the optimal voltage values may slightly vary from one production series to the other, even if all print heads belong to the same type. This is why a separate sub-page is provided for each production series, and the address of the pertinent sub-page is stored on the memory elements 40 of all the print heads belonging to this production series according to an embodiment of the present invention.

In addition, since the print heads are subject to aging, the optimal energizing voltages may depend on the accumulated time thead for which the print head has been operating. The invention offers the possibility to make a correction for these ageing effects by re-configuring the printer from time to time. The accumulated operating time thead may be stored in a register in the control unit 18 of the printer and may be transmitted to the web server 10 in the configuration procedure. Then, one server subpage will contain the correct voltages for operating times thead between, for example, 50 to 100 hours, another one for 100 to 150 hours and so on. As an alternative, the server page may be an active page calculating in real time the correct voltages on the basis of the value thead transmitted through the Internet.

Another group 54 of printing parameters specifies—again for each production series—the amount of positional offset of the individual nozzles in the main scanning direction. These parameters are used in the printer for compensating the offsets by modifying the timings at which the individual nozzles are energized.

Another group 56 of printing parameters relates to the compensation of cross talk among the various channels of an ink jet print head. The program loaded in the control unit 18 of the printer will include a certain routine for cross talk compensation which is dependent on the parameters stored in the group 56. Like the optimal energising voltages, these parameters may also depend on the accumulated operating time of the print head. Instead of changing parameters for a fixed routine for cross talk compensation, it would also be possible in the reconfiguration procedure to replace the cross talk compensation routine as a whole according to the present invention.

Another group 58 of printing parameters specifies the optimal temperature T at which the ink should be kept during operation of the print head. In order to obtain a high image quality, careful control of the temperature is necessary, because the temperature has a great influence on the viscosity of the ink and hence on the process of droplet generation. The optimal temperature of the ink may depend on the age tink of the ink. Even when the type of the ink is not changed, the viscosity of the ink and hence the temperature parameter T may be subject to variations, because the ink is prepared in a batch process, and the physical properties of the ink may vary from batch to batch. All these effects can be taken into account by providing separate sub-pages 36 for each production batch of the ink (i.e. the address "/ink-xx" would stand for a specific production batch). The temperature parameter T stored on that page will then be determined on the basis of both the original viscosity and the age of the ink. The original viscosity is measured for each batch right after production, and the age of the ink is known from the production date of the batch.

Yet another group 60 of printing parameters relates to colour correction in a multi-colour print head. The routine for colour correction or parameters for these routine will depend on the type of ink which is implicitly specified by the address information in the memory element 42 of the ink cartridge according to the present invention.

Figure 3:
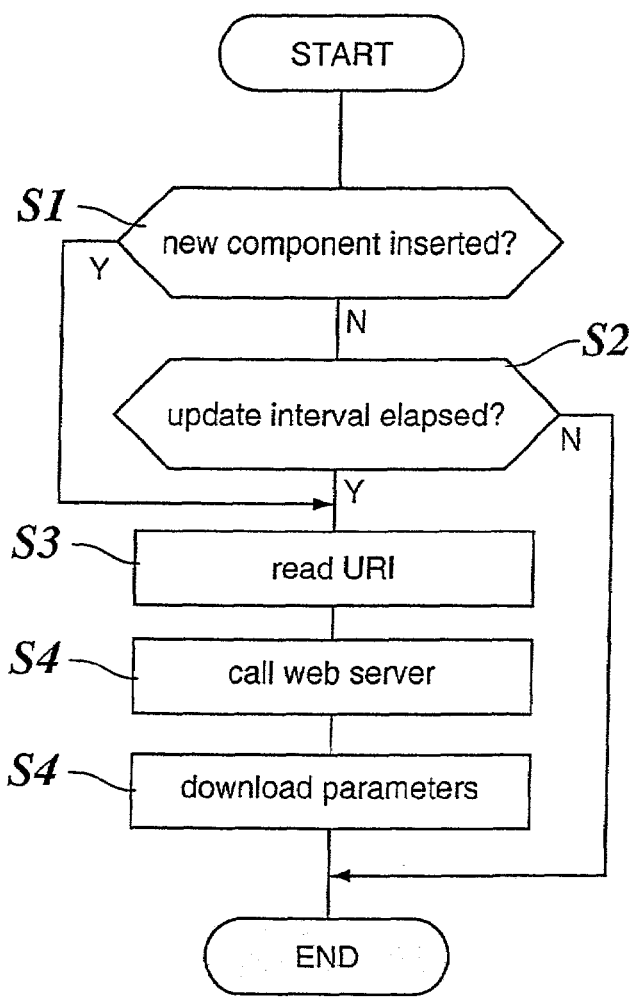
FIG. 3 is a flow chart of a program for configuring the printer according to an embodiment of the present invention.

FIG. 3 is a flow chart of a program for configuring or re-configuring the printer according to the present invention. This program may for example be performed by the control unit 18 of the printer each time the power switch of the printer is turned on. In step S1, the signal provided by the reading head 44 is checked in order to determine whether the contents of the memory elements 40 and 42 have changed. Such a change would indicate that a new component (print head or ink cartridge) has been inserted. If this is not the case, it is checked in step S2 whether a certain update interval has elapsed. This update interval is a time interval (e.g. in the order of several months) after which the printer should be reconfigured in view of any possible updates that have been entered into the web server 10 in the meantime. If neither a new component has been inserted nor the update interval has elapsed, the program ends. Otherwise, the URI specified in the memory elements 40 and 42 is read in step S3. Then, in step S4, the Internet client 16 is caused to establish a connection to the pertinent sub-page of the web server 10, and the printing parameters PP stored on that sub-page are downloaded into the printer in step S5 and applied appropriately, as discussed above, to configure or reconfigure the printer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of configuring a printer, wherein a set of printing parameters is stored in a control unit of the printer, the method comprising the steps of:

storing the set of printing parameters, which is adapted to a specific functional component of the printer, in a storage device addressable over the Internet at a predetermined URI (Universal Resource Identifier);

when the printer is to be configured, getting access to said URI, and downloading the set of printing parameters directly into the control unit of the printer; and each time a predetermined interval has elapsed, getting access to said URI, and downloading a new set of printing parameters directly into the control unit of the printer, wherein the set of printing parameters are individually determined for each production series of functional components on the basis of measurements performed on samples of the functional components for each production series, and the printing parameters for different production series are stored separately in the storage device.

2. The method according to claim 1, wherein said specific URI is indicated on the functional component in a machine-readable formal so as to be read automatically in the printer.

3. The method according to claim 1, wherein the set of printing parameters comprise data andlor program code for reconfiguring the printer in accordance with a type of recording medium being used.

4. The method according to claim 1, further comprising:
    detecting by the control unit whether a functional component has been interchanged; and if so,
    initiating a download of a new set of printing parameters pertinent to the new interchanged functional component.

5. The method according to claim 1, wherein the printer is an inkjet printer.

6. The method according to claim 2, wherein the printer is an inkjet printer.

7. The method according to claim 3, wherein the printer is an inkjet printer.

8. The method according to claim 4, wherein the printer is an inkjet printer.

9. A printer comprising a control unit including a memory in which printing parameters pertaining to a specific function component of the printer are stored, wherein the control unit includes an Internet client for connecting to a URI at which the printing parameters are stored in a storage device, and for loading the printing parameters into the memory, wherein the Internet client is arranged to initiate a downloading of new printing parameters from said URI each time a predetermined time interval has elapsed, wherein the printing parameters stored in the memory are individually determined for each production series of functional components on the basis of measurements performed on samples of the functional components for each production series, and the printing parameters for different production series are stored separately in the storage device.

10. The printer according to claim 9, further comprising at least one interchangeable functional component, wherein the control unit is adapted to detect whether a functional component has been interchanged and, if this is the case, to initiate a download of a new set of printing parameters pertinent to the new functional component.

11. The printer according to claim 10, wherein the interchangeable functional component is provided with a memory element storing URI information, and the printer has a reading head for reading said URI information when the functional component is inserted in the printer.

12. An Ink cartridge for use as an interchangeable functional component in the printer as claimed in claim 11, wherein the ink cartridge includes a memory element in which a URI is stored in a machine-readable format.

13. A toner cartridge for use as an interchangeable functional component in the printer as claimed in claim 11, wherein the toner cartridge includes a memory element in which a URI is stored in a machine-readable format.

14. The printer according to claim 9, wherein the printer is an inkjet printer.

15. The printer according to claim 10, wherein the printer is an inkjet printer.

16. The printer according to claim 11, wherein the printer is an inkjet printer.

* * * * *